US006803921B1

(12) United States Patent
Balasubramanian et al.

(10) Patent No.: US 6,803,921 B1
(45) Date of Patent: Oct. 12, 2004

(54) USE OF SOFTPROOFING TO ASSIST IN THE RENDERING OF IMAGES OF UNKNOWN COLORIMETRY

(75) Inventors: Thyagarajan Balasubramanian, Webster, NY (US); Robert J. Rolleston, Rochester, NY (US); Stephen K. Herron, Webster, NY (US); Katherine Loj, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/574,083

(22) Filed: May 18, 2000

(51) Int. Cl.[7] .............................................. G06T 15/00
(52) U.S. Cl. ...................... 345/597; 345/593; 345/597; 345/600; 345/604
(58) Field of Search ................................ 345/593, 595, 345/597, 600, 604; 382/167

(56) References Cited

U.S. PATENT DOCUMENTS

| | | | | |
|---|---|---|---|---|
| 5,296,947 A | * | 3/1994 | Bowers ...................... 358/527 |
| 5,754,222 A | * | 5/1998 | Daley et al. ................. 348/184 |
| 6,157,735 A | * | 12/2000 | Holub .......................... 382/167 |
| 6,307,961 B1 | * | 10/2001 | Balonon-Rosen et al. .. 382/167 |
| 6,362,808 B1 | * | 3/2002 | Edge et al. .................. 345/153 |

* cited by examiner

Primary Examiner—Michael Razavi
Assistant Examiner—Motilewa Good-Johnson
(74) Attorney, Agent, or Firm—Fay, Sharpe, Fagan, Minnich & McKee, LLP

(57) ABSTRACT

A method for determining and assigning colorimetry and authorship device information to an image of unknown colorimetry includes iteratively displaying the image on a display device and selecting possible source device profiles for transforming the image. When a possible source device is indicated or selected, the source device is emulated on the display device and the image is displayed through the emulation. A user can then evaluate the indicated source device and if necessary indicate a new possible source device. When the most likely source device is selected, further image processing is enabled. The method can be carried out on a color image processor comprising a source device emulator and display device interface. The display device interface can use a display device profile for profile connection space to display device transformation.

20 Claims, 7 Drawing Sheets

USE OF SOFTPROOFING TO ASSIST IN THE RENDERING OF IMAGES OF UNKNOWN COLORIMETRY

BACKGROUND OF THE INVENTION

1. Field of the Invention

The invention relates to the art of rendering images. The invention finds particular application where the colorimetry of an image is unknown.

2. Description of Related Art

Modern electronic image files contain identifying information. The identifying information is usually stored in what is called a header section of the image files. The header can identify a means with which the image was created. For example, the header can list an authoring device by manufacturer and model number as well as describe configuration settings that were used during authoring. Additionally, the header can describe a color space the authoring device operates in. The header information can be used by image processing equipment to properly interpret image data within the file and automatically ensure proper rendering. The header information is most important when an image created on a first image processing system is rendered on a second image processing system. The header information is especially important when the second image rendering system is totally unaware of, and disconnected from, the first image processing system or authoring device. For example, when an image is anonymously posted and retrieved from a computer network or bulletin board, such as, for example, the INTERNET, header information is especially important. Modern image processing equipment depends on the header information in order to accurately and automatically render an image created with a first device in the first color space with a second device in a second color space.

Unfortunately, not all image files contain an identifying header section. These older image files, or image files created on authoring devices that do not provide complete identifying information are referred to in this document as legacy images. When these legacy files are being processed, the image processing equipment must request operator intervention in order to properly identify and render the image. Often, the operator is presented with a list of possible sources for the data. For example, while processing a CMYK (cyan, magenta, yellow, key (black)) image of unknown origin, the user may be asked to pick the device the image could have been created with, from a list including Specification Web Offset Printing (SWOP) devices, Japan-Color devices, Euroscale devices, and/or other devices. As another example, while processing scanned RGB files, choices may include the scanner, scanned medium (e.g photographic, lithographic), and tone scale (gamma) correction.

There are problems with this image source identification technique. One problem is that often the operator does not know where the file came from. In these cases the operator is forced to guess which of the listed devices was used to create the image. Currently, after guessing at image authorship, the user must make a test print in order to verify his guess. If after examining the test print, the user determines that his guess was incorrect, another guess is made and another test print is created. Color printing can be a relatively slow process. For example, color printing is slower than black and white laser printing. Additionally, in at least some cases, the list of possible image authoring devices is quite long. Therefore, the process of guessing at authorship and generating test prints can be an expensive, time-consuming, aggravating, iterative process.

Recently, automated methods have been proposed to analyze legacy images and automatically surmise the images authorship and colorimetry. However, these automated methods have not as yet been perfected. For, example, in some instances these automated methods are able to reduce the length of the list of possible authoring devices, but are unable to make a final selection. Furthermore, these automated methods are not always available.

Therefore, additional legacy image authorship device identification methods are needed. In the best of situations, additional methods are needed to allow a user or operator to approve the authorship selection arrived at by the automated methods. In less sophisticated systems additional methods are needed to allow a user to quickly sort through a shortened list of choices arrived at by the automated methods. In the least sophisticated systems additional methods are needed to allow a user to quickly sort through the entire list of possible authoring devices.

BRIEF SUMMARY OF THE INVENTION

Therefore, a method of softproofing, or previewing an image on a display device, for the purpose of evaluating the image and determining the colorimetry of the image, has been developed. The method can be performed using a color image processor and an associated display device. The method comprises the steps of opening an electronic image file containing an image, indicating a possible source for the image file, setting a currently indicated source parameter to reflect the indicated source, transforming the image by combining the image with a source profile for the currently indicated source and a display device profile for the associated display device and displaying the transformed image. The transformations or combinations serve to allow the image to be displayed, as it would appear if the currently indicated source were an actual source of the image.

The displayed image is then evaluated to determine if the currently indicated source should be assigned to the image.

Additionally the invention includes a color image processor system comprising a display device and a color image processor for performing the method. The system comprises a source device emulator for accepting an image file and transforming an image from the image file by combining the image with colorimetry information from an indicated source device profile. The color image processor also includes a display device interface for further transforming a version of the image by combining the version of the image with colorimetry information from a display device profile associated with the display device so that the image can be properly displayed on the display device.

One advantage of the present invention is that it allows a display device such as, for example a computer CRT to be used to test the accuracy of guesses about the authorship and colorimetry of a legacy image file.

Another advantage of the present invention is that it eliminates the need to use relatively slow rendering devices, such as, for example, color printers, to test the accuracy of guesses about the authorship and colorimetry of a legacy image file.

Another advantage of the present invention is that it allows a plurality of guesses about the authorship and colorimetry of a legacy image to be quickly evaluated in a side-by-side comparison.

Another advantage of the present invention is that it allows a user to determine the correct or appropriate colorimetry of a legacy file in less time than other methods and systems do.

Another advantage of the present invention is that it allows a user to determine the correct or appropriate colorimetry of a legacy file without consuming print media, such as paper.

Another advantage of the present invention is that it allows a user to determine the correct or appropriate colorimetry of a legacy file without wasting printing materials such as, for example, toners or colorants.

Yet another advantage of the present invention is that it allows a user to determine the correct or appropriate colorimetry of a legacy file at a reduced cost of time and materials.

Still further advantages of the present invention will become apparent to those of ordinary skill in the art upon reading and understanding the following detailed description of the preferred embodiments.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

DETAILED DESCRIPTION OF THE INVENTION

Figure 1:
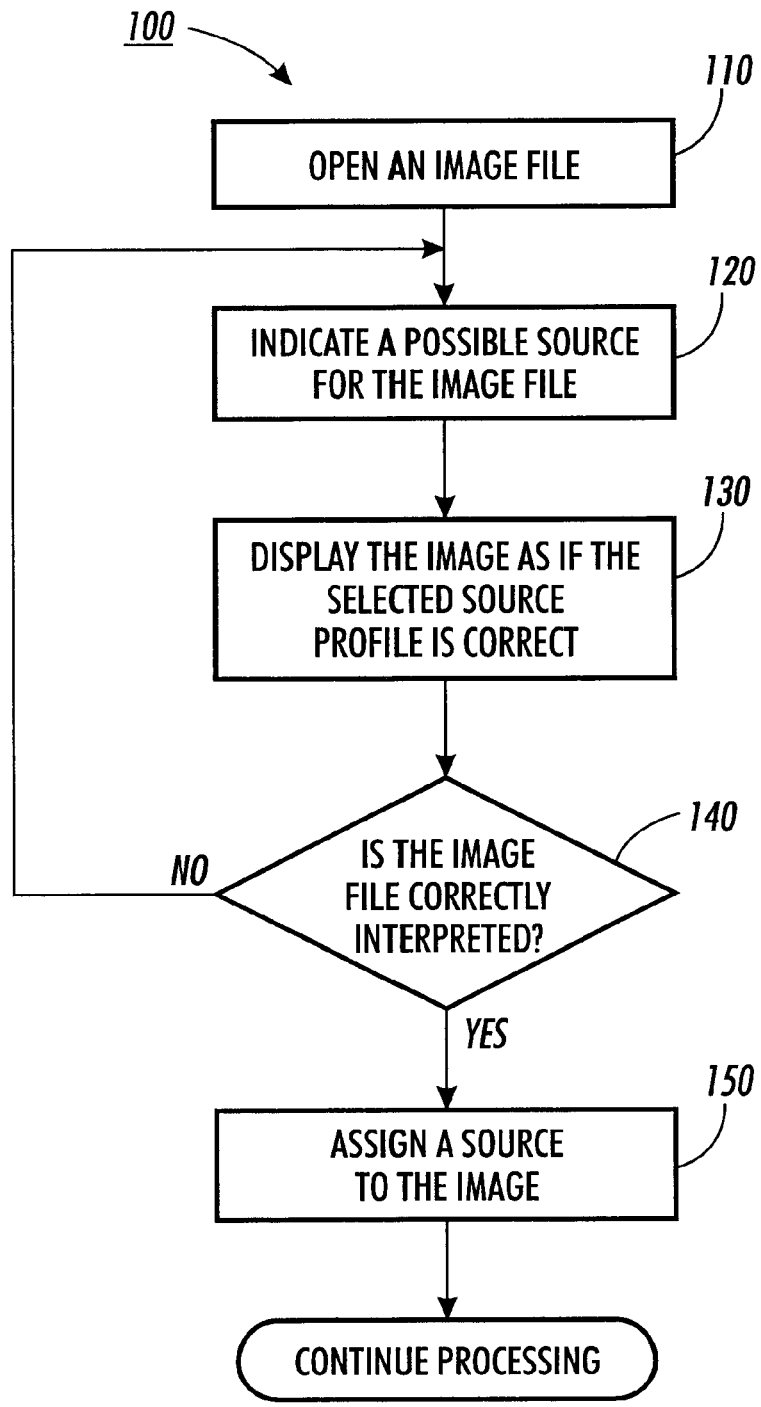
FIG. 1 is a flow chart illustrating a method for determining the authoring device and colorimetry of a legacy image file.

Referring to FIG. 1, a method 100 for rendering an image, includes methods for source or authorship device colorimetry identification and assignment.

The method 100 begins with an image-opening step 110. In the image-opening step 110, a user presents a color image processor with a legacy image file. The image file can be presented to the color image processor via any conventional means. For example, the image file can be delivered on a portable medium or can be directly downloaded from an image processing network, or a computer network such as the INTERNET. The color image processor then opens the file in a conventional manner. The color image processor identifies the file type in a known manner and prepares for further processing.

In a preliminary source-indicating step 120, the user indicates to the color image processor, a possible source of the image. Typically, the possible source is indicated through a selection process. The user is presented with a list of possible sources for the image. Any conventional method can be used for presenting the list to the user. Typically, the list is presented on a computer screen or liquid crystal display. Preferably the list is presented on a computer cathode ray tube (CRT). The CRT is preferred because the CRT can be used later to display various renditions of the image. The list of possible sources can simply be a function of a file type identified in the image-opening step, or it can be based on other information found within or known about the file. The user then makes a guess about the source or colorimetry of the file. The user uses the guess to indicate or select the most likely source from a list of possible sources. By indicating a possible source, the user sets a currently indicated source parameter equal to the indicated source.

Of course, other methods of indicating a possible source of the image can be used. For example, the user can type in the name of a possible source of the image to indicate a preliminary source selection. Alternatively, the image processing system could itself choose a possible source, e.g. the source that was last selected, or the sources most frequently selected in the past.

During an image display step 130, the image is displayed on a display device such as, for example a cathode ray tube (CRT). The color image processor uses information it has about the colorimetry of the currently indicated source device to transform the image from its original color space into a device independent color space. The color image processor then transforms the image into the color space of the display device using colorimetry information it has about the display device. The result of the transformations is an emulation of the currently selected source device on the display device. Therefore the image is displayed on the display device, as the image would appear if the image were rendered on the currently indicated source device.

In some implementations, the user can indicate a plurality of likely sources. In that case, the image can be displayed a plurality of times across the display device. Each instance of the image is rendered, in a manner that is based on an associated currently indicated source selection.

In either case, in a source evaluation step 140, the user reviews the displayed image or images. Of course, preferably the review is based on the displayed image or images. However, in some cases, it may be desirable to print images for evaluation purposes. For example, where a plurality of possible sources are being compared, the user may want to print, an image or set of images. For example the user may want to double-check a source selection before making it final. Therefore, the source evaluation step 140 can include the printing of images.

If one of the images appears to represent a correct interpretation of the image file or if one of the images appears to be an acceptable or a preferred interpretation of the image file, the operator can make a final source indication.

In a source assignment step 150 the finally indicated source is assigned to the image file. Source assignment can be temporary or permanent. A temporary source assignment is used for the purposes of further image processing that is to follow immediately after source assignment. Permanent assignment adds or replaces header information about the finally selected source to the image file. Adding this header information to the file converts it from a legacy image file that is incompletely described to a modern image file that is uniquely identified in terms of its color signature. As such, the newly updated image file can be shared, manipulated and automatically rendered by modern image processing equipment without ever again having to be analyzed for source colorimetry.

If none of the instances of the image appear to be correct, the user may return to the preliminary source selection step, update the currently indicated source to a new source and display a new instance or set of instances of the image and repeat the source evaluation step. This sequence can be repeated until an appropriate source is selected and assigned to the image.

Alternatively, final image source assignment can be delayed until after further processing and analysis.

Figure 2:
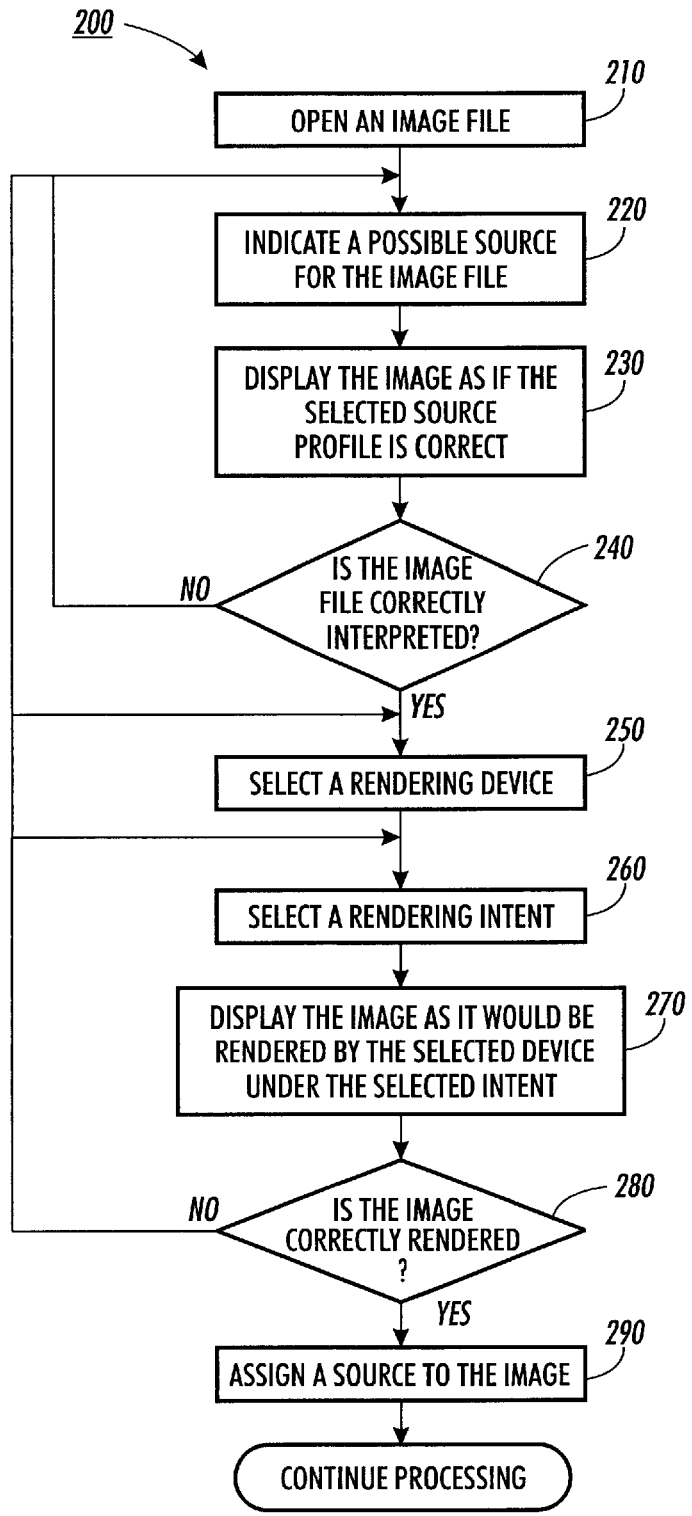
FIG. 2 is a flow chart illustrating the method of FIG. 1 extended to include rendering device and rendering intent emulation.

For example, referring to FIG. 2, a method 200 for rendering an image also includes an image-opening step 210, a preliminary source selection step 220, an image display step 230, and a source evaluation step 240. Those steps 210, 220, 230, 240, are all similar to similarly named steps described in reference to FIG. 1. The method 200 also includes a rendering device selection step 250 and a rendering intent selection step 260. The selection steps 250, 260 allow for the selection of a rendering device and rendering intent respectively.

Selecting a rendering device provides the color image processor with information about the rendering device's colorimetry profile.

Rendering intents are known in the art. Examples of rendering intents include perceptual, relative calorimetric, saturation and absolute calorimetric. A rendering intent is a descriptor of a transformation of the image colors to a color description native to the output device. The transformation emphasizes features of the image that are most important to the user. Selection of a rendering intent notifies the color image processor as to which set of trade offs are acceptable when rendering the image. Trades offs can be necessary due to limitations of the rendering device. For example, where the saturation rendering intent is selected the color image processor is notified that the saturation of the image should be preserved, perhaps at the expense of accuracy in hue and lightness. Rendering intent selection can be accomplished through any conventional means. For example, the user can use a keyboard to type in the name of a rendering intent. Preferably the user is provided with a list of rendering intents from which the user may make a selection. Of course the user can opt not to make a rendering intent selection or to allow the color image processor to use a default rendering intent.

In an output preview step 270, the image file is transformed through the colorimetry profile of the currently indicated source, the rendering device's colorimetry profile, and any specified rendering intent. Of course, the color image processor again uses information it has about the colorimetry of the display device to additionally transform the image to compensate for idiosyncrasies of the display device. The transformed version of the image is displayed on the display device.

The displayed image is inspected in an output evaluation step 280. If the displayed image is unsatisfactory, new selections of rendering devices and/or rendering intents can be made and again previewed, on the display device. Furthermore, if the user believes the image rendering can be improved upon, the user can return to earlier stages of the process and make new preliminary image source selections, thereby updating the currently selected source parameter. The user can then again, review the new selections' effect on the image as various rendering devices and various rendering intents are emulated on the display device.

Once the user is satisfied with the displayed image, the currently indicated image source can be assigned to the image in a source assignment step 290.

Figure 3:
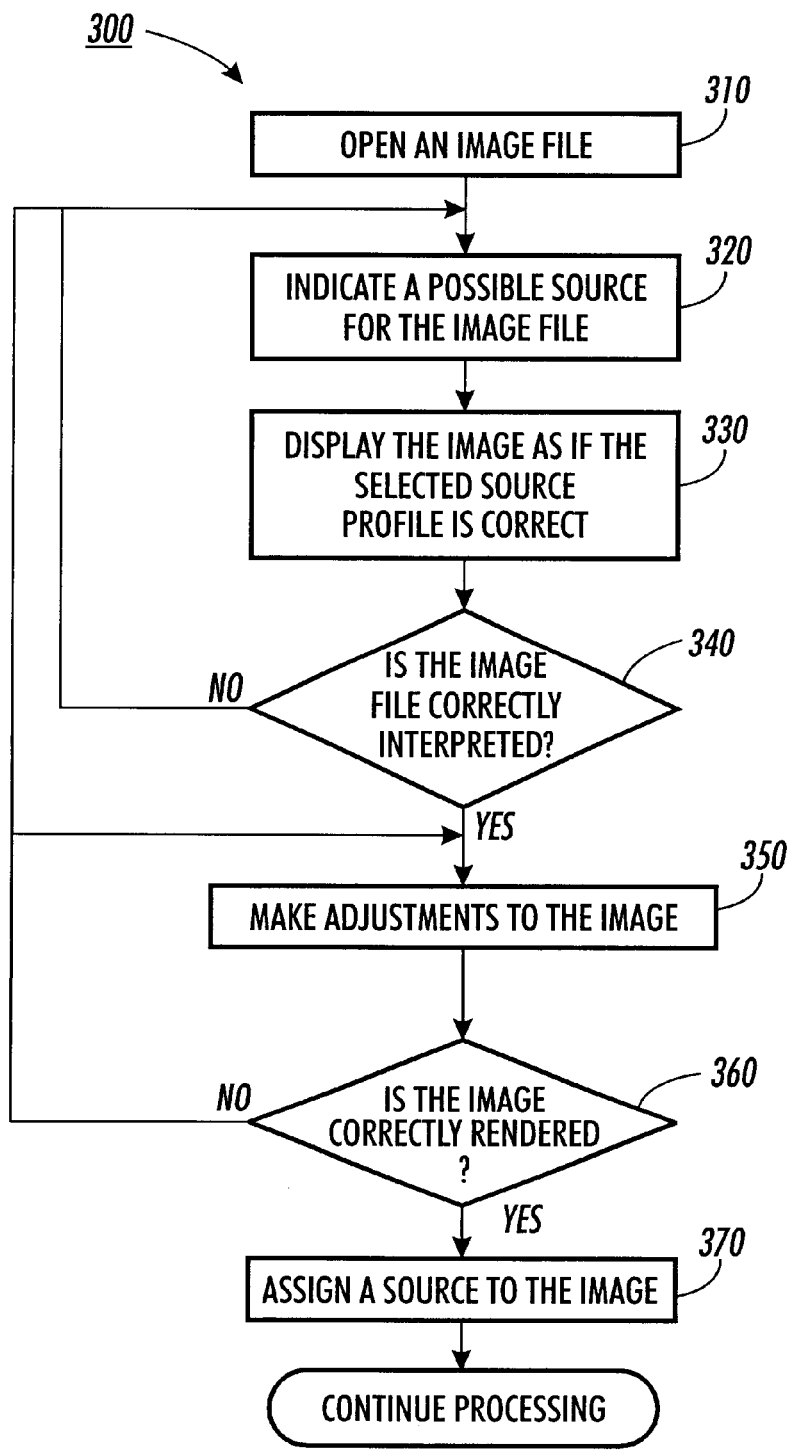
FIG. 3 is a flow chart illustrating the method of FIG. 1 extended to include image adjustment features.

Referring now to FIG. 3, a method 300 for rendering an image also includes an image-opening step 310, a preliminary source indication step 320, an image display step 330, and a source evaluation step 340. Those steps 310, 320, 330, 340, are all similar to similarly named steps described in reference to FIG. 1 and FIG. 2. The method 300 also includes an image adjustment step 350.

In one embodiment, during the image adjustment step 350 a user is provided with an ability to additionally transform the image under an abstract colorimetry profile. The abstract colorimetry profile can be used to change an appearance of the image. The abstract colorimetry profile can be selected from a set of prederived abstract profiles. For example, an abstract profile that enhances a contrast of the images can be selected. Another abstract profile can be used to, for example, enhance an image's color saturation.

Alternatively the user can be provided with interactive controls to adjust various image parameters. Interactive controls include, slide bar type controls. For example, image characteristics such as, hue, brightness, gamma correction, and contrast can all be varied with interactive controls. The displayed image can be changed to indicate an effect of using the interactive controls. When the correct combination of adjustments is found, the image can be electronically saved or rendered. The final settings of the interactive controls can be saved as a new abstract profile. The newly saved abstract profile can be recalled later to correct and adjust other images. For example, the newly saved abstract profile can be used to quickly and beneficially adjust images with authorship or colorimetry similar to that of the current image.

Once an abstract profile, set of abstract profiles or set of control settings is selected for enhancing the image, the abstract profile, set of abstract profiles or set of control settings can be combined with the currently selected source profile to create a new currently selected source profile. The new currently selected source profile can then be assigned to the image in a subsequent source assignment step.

During or after image adjustment, the image is examined in an adjustment evaluation step 360.

If the user is not satisfied with any combination of adjustments, the user can elect to repeat some of the steps of the method 300. For example, the user can return to the preliminary source indication step 320 and update the currently selected source and/or repeat the image adjustment step 350 and make further image adjustments.

Once the user is satisfied with the displayed image, the currently indicated image source can be assigned to the image in a source assignment step 370.

Of course, the methods 200, 300 described in reference to FIG. 2 and FIG. 3 can be combined to form a method that includes image source identification 100, image adjustment 350 and output device and rendering intent emulation 270. Additionally, other steps can be added. For example, imaged editing steps can be added to any of the described methods.

Furthermore, where any of the methods 100, 200, 300 are applied to images within a multi-image document subsequent legacy images within a document can be open automatically in anticipation of performing the methods. For example, after any of the source assignment steps 150, 290, 370 are performed with respect to a first legacy image within a multi-image document, possessing can automatically loop back to the image opening steps 110, 210, 310 wherein a second legacy image is found within the document and opened in preparation for further processing under the associated method 100, 200, 300.

Figure 4:
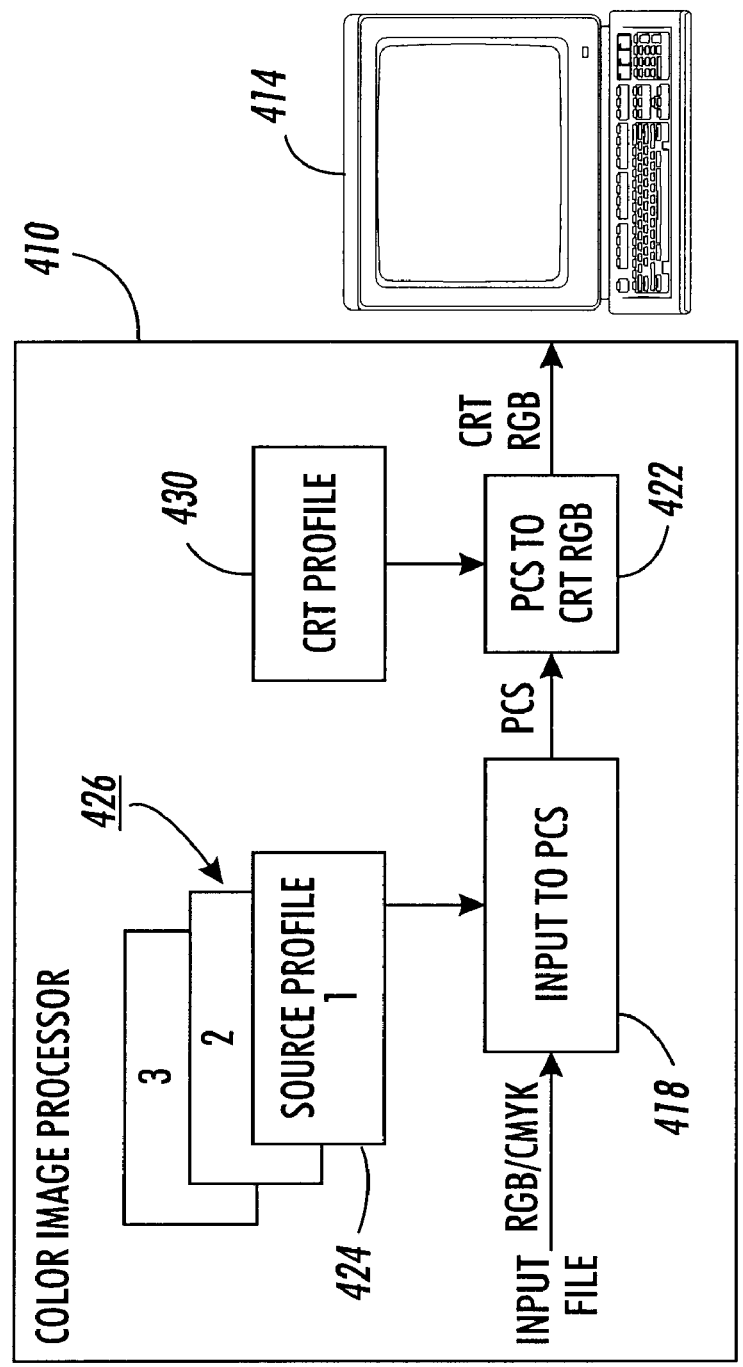
FIG. 4 is a block diagram of a color image processing system for carrying out the method of FIG. 1.

Referring now to FIG. 4, a system for carrying out the method 100 of FIG. 1 includes a color image processor 410 and a display device 414. Typically, the display device 414 includes a CRT (cathode ray tube). However other display devices can be used. For example, flat panel displays and liquid crystal displays can be used. The color image processor 410 includes a source device emulator 418 and a display device interface 422. The source device emulator 418 combines an input image with an indicated source device profile 424. In the illustrated system the source device emulator transforms the image into a profile connection space. The profile connection space (PCS) is a color space based on the human visual system. The PCS allows a device independent description of color. Typically, profile connection spaces are defined using either a CIELAB or a CIEXYZ standard color space. Typically, the display device interface 422 is a PCS to CRT RGB space converter. The source device emulator 418 accepts an image file along with information from a library of image source profiles 426. The image file is directed or delivered to the source device emulator 422 by a user or by the image processor. The image file can be delivered via a floppy disk (not shown), a file stored in the color image processor or can be directed to the source device emulator via a computer or image processing device network (not shown). The information delivered from the library of image source profiles 426 includes the colorimetry of potential image sources.

In the illustrated embodiment, the display device interface 422 or PCS to CRT RGB space converter accepts as input a profile connection space version of an image from the image file, as well as information from a display device colorimetry profile 430. However, other kinds of display device interfaces can be used. All that is required is that the display device accepts an image in whatever format it is provided in and transforms it into a format that can be properly interpreted by the display device.

Typically the library of image sources profiles 426 and the display device colorimetry profile 430 are stored at least temporarily in a computer or microprocessor memory. However they can also be stored and received from bulk computer storage or a computer or image processor network. An example of a bulk computer storage device includes a computer hard drive.

The source device emulator 418 combines the input file with the indicated image source profile 424 and creates a PCS or profile connection space version of the image. In the illustrated embodiment the PCS version of the image is passed to the display device interface. The display device interface 422 combines the PCS version of the image with the display device profile 430. In this way, the source device emulator 418 and display device interface 422 work together to emulate the indicated source device 424 on the display device 414 or on a portion of the display device 414.

Figure 5:
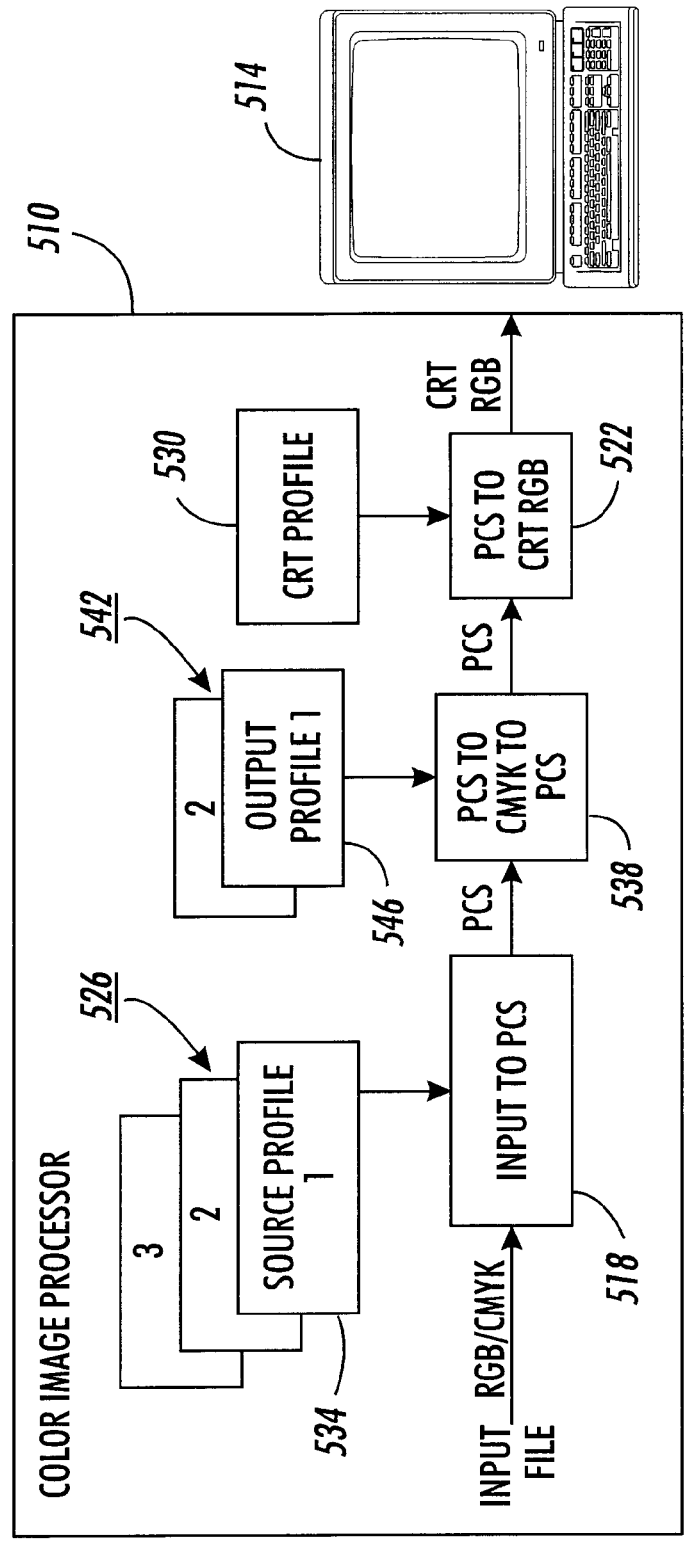
FIG. 5 is a block diagram of a color image processing system for carrying out the method of FIG. 2.

Referring to FIG. 5, a system for carrying out the method of FIG. 2 also includes a color image processor 510 and a display device 514. Typically the display device 514 is a CRT. The color image processor 510 includes a source device emulator 518 and display device interface 522. Included with those components are a library of image source profiles 526 and a display device colorimetry profile 530. Again, the source device emulator 518 combines the input file with an indicated image source profile 534 and creates a PCS or profile connection space version of the image. The illustrated display device interface 522 is a PCS to CRT RGB converter. In addition the system includes an output emulator 538. The output emulator 538 temporarily converts the PCS version of the image to a color space that is compatible with an indicated output or rendering device. Typically this is a CMYK color space for a printing device. A user can view a library of output device profiles 542 and indicate a profile for an output device he or she intends to use. The output emulator 538 transforms a version of the image based under an indicated or selected output device profile 546. Additionally, the output emulator transformation can include the effect of an indicated or selected rendering intent. The transformation has the effect of modeling the idiosyncrasies of the indicated output or rendering device on the image. After transforming the image, the output emulator 538 converts or transforms the image back to a format that is compatible with the display device interface 522, for example, the profile connection space (PCS), and passes it to the display device interface 522. The output emulator 538, display device interface 522 and of course the display device 514, work together to emulate the selected output or rendering device on the display device.

Typically the library of output device profiles 542 the library of image source profiles 526, and the display device colorimetry profile 530 are stored at least temporarily in a computer or microprocessor memory. However they can also be stored and retrieved from bulk computer storage or a computer or image processor network.

Figure 6:
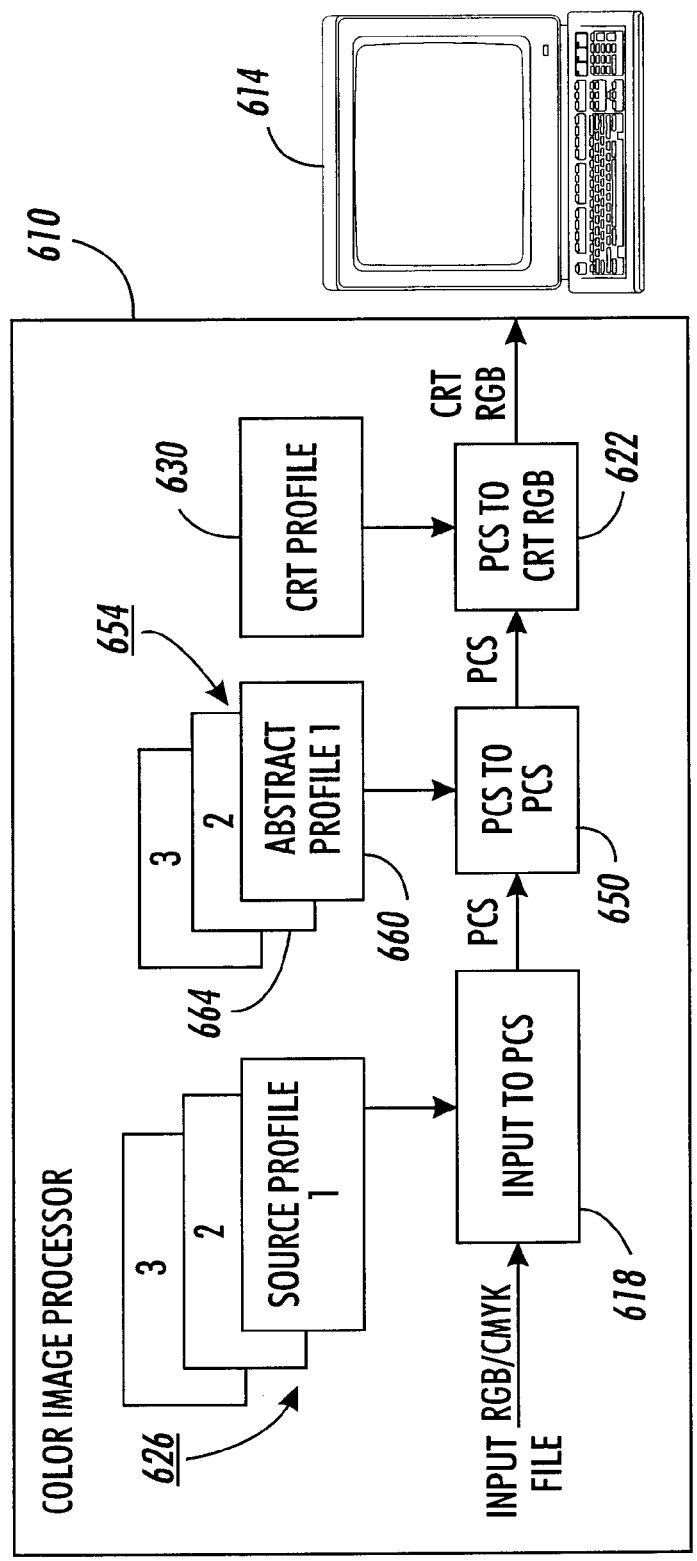
FIG. 6 is a block diagram of a color image processing system for carrying out the method of FIG. 3.

Referring to FIG. 6, a system for carrying out the method of FIG. 3 also includes a color image processor 610 and a display device 614. Again, typically the display device 614 is a CRT. However, other display devices can be used. The color image processor 610 includes a source device emulator 618 and display device interface 622. Included with those components are a library of image source profiles 626 and a display device colorimetry profile 630. Again, the source device emulator 618 combines the image file with an indicated image source profile 634 and creates a PCS or profile connection space version of the image and, again, because the display device shown is a CRT, the illustrated display device interface 622 is a PCS to CRT RGB converter. In addition the system includes an image adjuster 650. One kind of image adjuster 650 is an abstract profiler. The abstract profiler accepts abstract profiles selected from a library of abstract profiles 654. A first abstract profile 660 can be selected, for example, by a user. The abstract profiler can then transform the image in a manner based on the first abstract profile 660. For example, the first abstract profile 660 may be selected in order to enhance the colorfulness of the image. Alternatively or additionally, the user may select, for example, a second abstract profile 664 that increases the contrast of an image.

Typically the library of abstract profiles 654, the library of image source profiles 626 and the display device colorimetry profile 630 are stored at least temporarily in a computer or microprocessor memory.

However they can also be stored and retrieved from bulk computer storage or a computer or image processor network.

Alternative image adjusters 650 include interactive color adjustment tools. For example, the user can be provided with a set of slide controls. The controls can be used to adjust, for example, hue, contrast, brightness, gamma correction and color saturation.

Of course, an image adjuster 650 can include a plurality of adjusting means. For example, an image adjuster can provide the user with both a library of the selectable abstract profiles and interactive image adjusting tools. In the later case, various interactive adjustment tool settings can be saved in the form of additional abstract profiles.

Whatever form the image adjuster 650 takes, the image adjuster can output an adjusted version of the image.

Alternatively, the adjustments can be combined with the indicated image source profile to create a new image source profile. In either case a version of the image and an indicated source profile are passed to the display device interface 622 and from there the image is displayed on the display device 614. Therefore, the effect of each adjustment can be immediately emulated and presented to the user.

As mentioned above, the methods depicted in FIG. 2 and FIG. 3 can be combined to produce a combined method that includes image source identification 100, image adjustment 350 and output device and rendering intent emulation 270.

Figure 7:
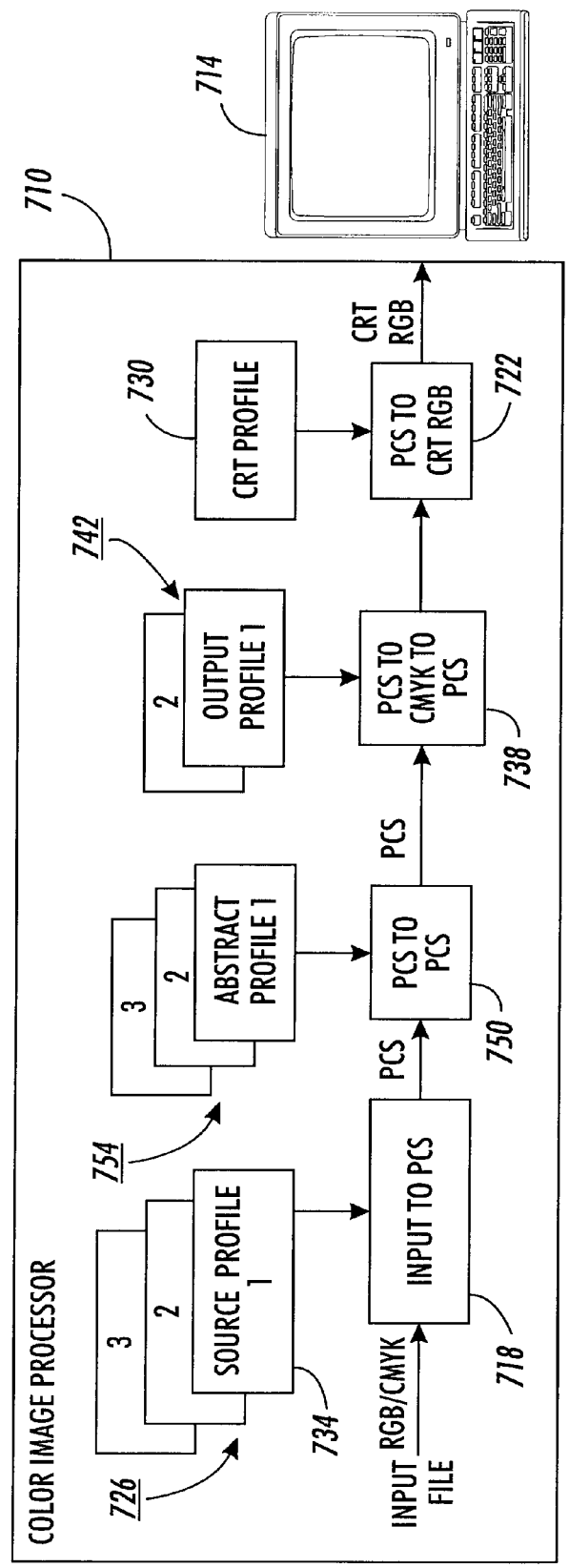
FIG. 7 is a block diagram of a color image processing system for carrying out a method comprised of a combination of the methods of FIG. 2 and FIG. 3.

Referring to FIG. 7, a system for carrying out the combined method also includes a color image processor 710 and a display device 714. Again, typically the display device is a CRT. The color image processor 710 includes a source device emulator 718 and display device interface 722. Included with those components are a library of image source profiles 726 and a display device colorimetry profile 730. Again, the source device emulator 718 combines the input file with an indicated image source profile 734. The color image processor 710 also includes an output emulator 738. A user can view a library of output device profiles 742 and indicate a profile for the output emulator to use as the bases for output device emulation. In addition the system includes an image adjuster 750 and a library of abstract profiles 754. Each of the named components in the color image processor 710 function in a manner similar to that of similarly named components of the earlier described embodiments.

In each of the embodiments, the separately described emulators, adjusters and device drivers can be implemented as a single composite transformer. Implementing the various components of the color image processors 410, 510, 610, 710 as composite transformers makes processing more efficient and minimizes quantization artifacts.

In all of the described color image processing systems, the source device emulators, image adjusters, output emulators and display device interfaces are usually implemented in software. The software is stored in computer or microprocessor memory and executed by a microprocessor or central processing unit. However the functions of the image adjusters, output emulators and display device interfaces can be carried out in various ways and by various devices, including but not limited to distributed processors and various components interconnected via computer or image processor networks.

The invention has been described with reference to particular embodiments. Modifications and alterations will occur to others upon reading and understanding this specification. For example, the order of the steps can be other than those depicted. For example, the image can be displayed under a default colorimetry or indicated source before the user makes a first preliminary source selection. Once a preliminary source selection is made, the user can be presented with a set of adjustments that model the adjustments available on the preliminarily selected device. With this feature, the user can identify not only the source device, but the source device settings that were used to create the image.

The method can be implemented with additional opportunities to loop back and change selections than depicted in the figures. Where it is possible to select a plurality of possible image sources for side-by-side comparison, the plurality of image instances can be displayed in thumbnail form and then selected for enlargement and more detailed viewing. It is intended that all such modifications and alterations are included insofar as they come within the scope of the appended claims or equivalents thereof.

What is claimed is:

1. A method of determining the colorimetry of an image of unknown colorimetry with a color image processor and an associated display device, the method comprising:

opening an electronic image file containing an image;

indicating a preliminary source supposition for the image file;

temporarily setting a currently indicated source to the indicated preliminary source supposition;

transforming the image with information from a source profile associated with the currently indicated source and a display device profile of the associated display device;

displaying the transformed image, thereby rendering the image as the image would appear if the currently indicated source were an actual source of the image, and evaluating the displayed image to determine if the currently indicated source should be assigned to the image indicating a new preliminary source supposition for the image if an evaluation of a prior preliminary source supposition results in a determination that the prior preliminary source supposition was incorrect, updating the currently indicated source to the new preliminary source supposition;

transforming the image with information from a new source profile associated with the updated currently indicated source and the display device profile of the associated display device;

displaying the transformed image, thereby rendering the image as the image would appear if the updated currently indicated source were an actual source of the image, and evaluating the displayed image to determine if the updated currently indicated source should be assigned to the image.

2. The method of claim 1 further comprising:

deciding if the image is displayed correctly, and if so;

assigning the currently indicated source to the image.

3. The method of claim 2 wherein assigning further comprises:

permanently assigning the currently indicated source to the image by adding or replacing information about the currently indicated source to the image file.

4. The method of claim 1 further comprising:

printing the transformed image for further evaluation.

5. The method of claim 1 where in the electronic image file further comprises:

an image specified in CYMK space.

6. The method of claim 1 where in the electronic image file further comprises:

an image specified in RGB space.

7. The method of claim 1 further comprising:

indicating an output device, and wherein the step of transforming further comprises:

further transforming the image with colorimetry information from an output device profile associated with the indicated output device.

8. The method of claim 7, further comprising:

indicating a rendering intent, and wherein the step of transforming further comprises:

modifying the colorimetry information from the output device profile based on the rendering intent.

9. The method of claim 1 further comprising:

enhancing the displayed image.

10. The method of claim 9 wherein enhancing further comprises:

using an interactive adjustment tool to vary image characteristics.

11. The method of claim 10 further comprising:

combining final settings of the interactive adjustment tools with the currently selected source profile to create a new source profile.

12. The method of claim 9, wherein enhancing further comprises:

transforming the image with information from a pre-defined abstract profile.

13. The method of claim 12 wherein transforming the image with information from a pre-defined abstract profile further comprises:

combining the pre-defined abstract profile with the currently selected source profile to create a new source profile.

14. The method of softproofing an image of claim 1 further comprising:

indicating a plurality of preliminary source suppositions for the image file;

setting a plurality of currently indicated sources to the plurality of indicated preliminary source suppositions, respectively;

transforming the image a plurality of times with information from a plurality of source profiles associated with the plurality of currently indicated sources and a display device profile of the associated display device, thereby generating a plurality of transformed images;

displaying the plurality of transformed images on the display device at one time, thereby rendering the image as the image would appear if the currently indicated sources were respective actual sources of respective ones of the plurality of images, and evaluating the displayed images to determine if any of the currently indicated sources should be assigned to the image.

15. A color image processor system comprising:

a display device, and a color image processor comprising:

a source device emulator for accepting an image file and transforming an image from the image file with colorimetry information from an indicated source device profile;

a display device interface for further transforming a version of the image by transforming the version of the image with colorimetry information from a display device profile associated with the display device so that the image can be properly displayed on the display device;

a means for indicating a preliminary source supposition operative to allow a user to temporarily set a currently indicated source parameter equal to an indicated preliminary source supposition;

an currently indicated device emulator for transforming a version of the image with colorimetry information associated with the currently indicated source so that the image can be displayed, via the display device interface, as the image would appear if currently indicated source were actually the source of the image;

a means for indicating a new preliminary source supposition operative to allow a user to temporarily set a currently indicated source parameter equal to the new indicated preliminary source supposition, if an evaluation of a prior preliminary source supposition results in a determination that the prior preliminary source supposition was incorrect; and a means for indicating a final source, thereby allowing the user to assign a finally indicated source to the image file.

16. The color image processor system of claim 15 wherein the color image processor further comprises:

an output device emulator for transforming a version of the image with colorimetry information contained within an indicated output device profile so that the image can be displayed as the image would appear if rendered on the indicated output device, thereby generating a new version of the image.

17. The color image processor system of claim 15 wherein the color image processor further comprises:

an image adjuster for adjusting image parameters.

18. The color image processor system of claim 17 wherein the image adjuster further comprises:

an abstract profiler for transforming a version of the image with information from a selected abstract profile.

19. The color image processor system of claim 17 wherein the image adjuster further comprises:

an abstract profiler for transforming a version of the image by combining the indicated source profile with an abstract profile to create a new indicated source profile.

20. The color image processor system of claim 17 wherein the image adjuster further comprises:

a set of adjustment tools for interactively adjusting the image parameters.

* * * * *